UNITED STATES PATENT OFFICE.

FRANCIS S. HADEN, OF CHELSEA, GREAT BRITAIN.

IMPROVEMENT IN COFFINS.

Specification forming part of Letters Patent No. 168,250, dated September 28, 1875; application filed September 13, 1875.

*To all whom it may concern:*

Be it known that I, FRANCIS SEYMOUR HADEN, of Sloane street, Chelsea, in the county of Middlesex, Kingdom of Great Britain and Ireland, have invented new and useful Improvements in Coffins, of which the following is a specification:

This invention is designed to accelerate the process of dissolution of interred bodies, to prevent, by the direct corrective agency of the earth, the insalubrious consequences attending that dissolution, to economize cemetery space, and to effect the early liberation of the soil for other purposes of utility.

My invention consists in making for these purposes coffins composed wholly or chiefly of perishable material of such nature that by the action upon it of the moisture of the earth in which it is buried it will become speedily disintegrated and decomposed, and thus leave the body exposed to the direct resolvent action of the earth.

I form such coffins of plastic or fluid materials capable of being molded or cast to appropriate form, and having the properties of becoming strong, hard, and rigid on exposure to the air, and of softening down again and quitting the inclosed body after being placed for a short time within the earth.

In carrying out my invention I form a pulp of glue, water, resin, linseed-oil, and whiting, mixed in or about the proportions of nine parts by weight of glue, three parts by weight of water, two parts by weight of linseed-oil, five parts by weight of resin, and of whiting enough to form a plastic, cohesive, ductile material, which I press into suitable molds, whereby the desired form of coffin is molded. To make the plastic composition, nine pounds of the best glue are first to be boiled in three pounds of water; then five pounds of resin in two pounds of best linseed-oil. The two decoctions are then to be well mixed together, and as much whiting incorporated with them as will render the whole mixture of the substance of dough. The exact proportions of these materials will, however, vary according to the dryness or humidity of the climate in which the composition has to be used; and in very dry climates some binding material, such as hemp or hair, may be added to insure the plastic compound against cracking.

The material should be left in the mold for about from twenty-four to thirty-six hours, after which it may be removed for use.

In some cases, instead of making the coffin entirely of plastic material, I construct a light frame-work of wood, the interstices of which I fill up by the insertion of slabs, forming panels of the above perishable compounds.

In cases where there is an escape of fluid from the body, I cover the inside of the coffin with a thin layer of pitch.

Having thus described the nature of my said invention, and the manner of carrying it into practical effect, I claim—

As a new article of manufacture, a perishable coffin composed wholly or in part of the materials herein described, or of the substantial equivalent thereof, being of such a nature that, by the action upon it of the moisture of the earth in which the coffin is buried, it shall be disintegrated and decomposed before the dead body which it has inclosed becomes decomposed, so as to leave said body exposed to the resolvent action of the earth.

F. SEYMOUR HADEN.

Witnesses:
W. LLOYD WISE,
   *Patent Agent, London.*
J. WATT,
   69 *King William Street.*